W. A. LORENZ & S. H. ROOD.
HERMETIC CLOSURE FOR RECEPTACLES.
APPLICATION FILED MAY 11, 1918.
1,299,974.
Patented Apr. 8, 1919.
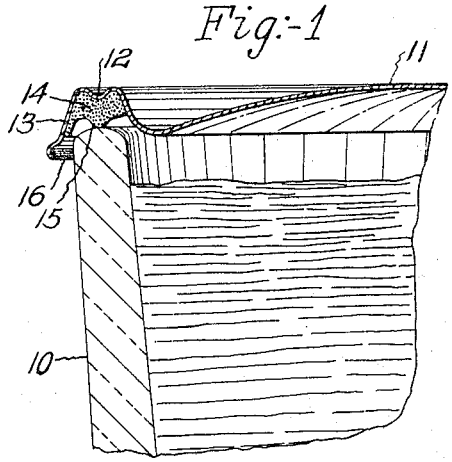
Fig.-1
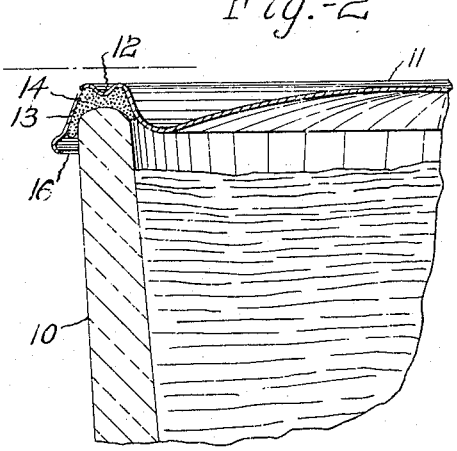
Fig.-2
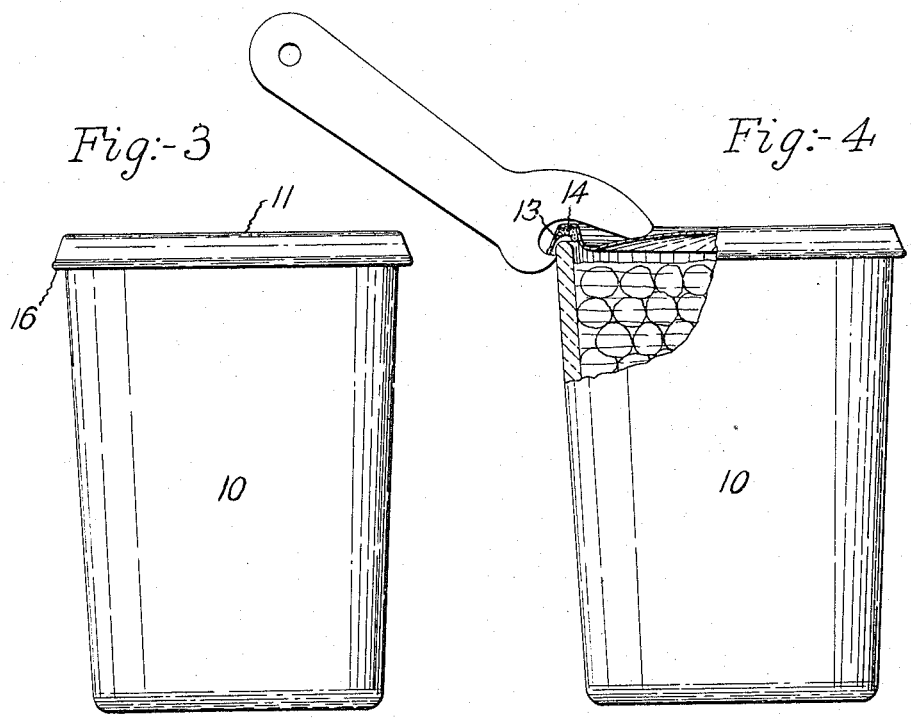
Fig.-3
Fig.-4
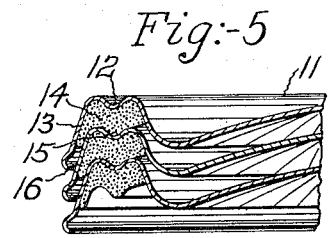
Fig.-5
Witness:
E. L. Jarvis.
Inventors:
William A. Lorenz.
Stanley H. Rood.
by Harry P. Williams
Atty

UNITED STATES PATENT OFFICE.

WILLIAM A. LORENZ AND STANLEY H. ROOD, OF HARTFORD, CONNECTICUT.

HERMETIC CLOSURE FOR RECEPTACLES.

1,299,974.  Specification of Letters Patent.  Patented Apr. 8, 1919.

Application filed May 11, 1918. Serial No. 233,823.

*To all whom it may concern:*

Be it known that we, WILLIAM A. LORENZ and STANLEY H. ROOD, citizens of the United States, residing at Hartford, in the county of Hartford and State of Connecticut, have invented a new and useful Improvement in Hermetic Closures for Receptacles, of which the following is a specification.

This invention relates to the construction of closures for tumblers, jars and the like receptacles for containing food products which are designed to be held sealed by atmospheric pressure.

The object of the invention is to produce a closure of this class comprising a cap and yielding gasket so shaped that in unsealed position but a thin edge of the gasket will rest upon the rim of the receptacle in order to reduce to a minimum resistance to the outflow of air when the package is subjected to the action of an exhaust pump, but when the cap is pressed downwardly for sealing the receptacle the cap wedges the material of the gasket transversely and spreads it in both directions over the rim on the inside and outside of the receptacle so as to cause a substantial seal.

In attaining this end the exposed face of the gasket is, between the inner and outer edges, provided with an annular rib designed to rest upon the rim of the receptacle, and the gasket recess in the cap is provided with an annular rib shaped to wedge the gasket material transversely in opposite directions when pressure is applied to the cap for sealing the receptacle.

In the accompanying drawings which illustrate the invention Figure 1 shows a section of a portion of a tumbler with a cap and gasket resting thereon in unsealed position. Fig. 2 is a similar view with the cap and gasket in sealed position. Fig. 3 shows, on smaller scale, a side elevation of a sealed package. Fig. 4 is a view illustrating a method of breaking the seal by a well known type of bottle opener. Fig. 5 shows how these closures may be nested so as to occupy but a small space and protect the gaskets.

The receptacle 10 may be a tumbler, jar or can of glass, porcelain or other material. The cap 11 may be made of metal or of other suitable material. This cap is provided with an annular rib 12 that extends into the gasket recess 13, which rib is desirably formed by pressing inward the top of the cap near the outer edge.

The gasket 14 may be formed to shape before it is placed in the gasket recess in the cap, or the gasket material may be molded into the recess and then rolled or pressed to shape therein. The gasket has an annular rib 15 on its lower or exposed face between the inner and outer edges and its outer edge is preferably extended downward a little lower than its inner edge so that when the receptacle is sealed the gasket will spread farther down on the outside than on the inside of the rim of the receptacle.

When a closure thus formed is placed over a receptacle but a relatively thin edge of the gasket will rest upon the rim of the receptacle, as shown in Fig. 1, and thus offer but slight resistance to the outflow of air when the receptacle is being exhausted of air by the usual means. After the exhaustion is completed and the closure is pressed downwardly the annular rib in the recess in the cap spreads the gasket transversely in both directions, that is, it wedges the gasket material outwardly and inwardly and spreads it over the rim of the receptacle so as to effect a substantial seal on a considerable surface of the receptacle, as shown in Fig. 2.

These gaskets may be made separate or may be permanently fastened in the caps. The closures may be nested together, as illustrated in Fig. 5, thus occupying but little space, and when the closures are thus nested the gaskets will be protected from injury.

It is preferred to bend the extreme edge of the cap inwardly, as shown at 16, so that there will be no sharp or rough edge.

A receptacle sealed with this form of closure can be readily opened by the employment of the well known crown seal bottle opener, as illustrated in Fig. 4.

The invention claimed is:

The combination with a receptacle of a hermetic closure comprising a cap formed with an annular gasket channel in its under side near the outer edge, the cap over said channel being pressed downwardly so as to provide an exterior annular recess and an interior annular wedge at the top of the gasket channel, and a plastic gasket molded into and fitting the wall of said channel, said gasket below said wedge and between its edges on the exposed face having a downwardly extending annular rib with an unbroken surface which is designed to rest lightly upon the top of the rim of the receptacle which the cap is designed to close and said rib being spread over the top of the rim of the receptacle by said wedge when the cap is pressed to place for sealing the receptacle.

WILLIAM A. LORENZ.
STANLEY H. ROOD.